(12) United States Patent
Spencer et al.

(10) Patent No.: US 11,369,881 B2
(45) Date of Patent: Jun. 28, 2022

(54) APPARATUS AND METHOD OF USER ANALYSIS AND CONTENT SELECTION

(71) Applicant: Sony Interactive Entertainment Europe Limited, London (GB)

(72) Inventors: Hugh Alexander Dinsdale Spencer, London (GB); Paul Terence Mulligan, London (GB); Andrew John Nicholas Jones, London (GB)

(73) Assignee: Sony Interactive Entertainment Europe Limited

( * ) Notice: Subject to any disclaimer, the term of this patent is extended or adjusted under 35 U.S.C. 154(b) by 0 days.

(21) Appl. No.: 17/078,723

(22) Filed: Oct. 23, 2020

(65) Prior Publication Data
US 2021/0121783 A1   Apr. 29, 2021

(30) Foreign Application Priority Data

Oct. 24, 2019   (GB) .................................... 1915423

(51) Int. Cl.
*A63F 13/67* (2014.01)

(52) U.S. Cl.
CPC .................................... *A63F 13/67* (2014.09)

(58) Field of Classification Search
CPC ... A63F 13/67; A63F 13/798; A63F 2300/535
See application file for complete search history.

(56) References Cited

U.S. PATENT DOCUMENTS

| 5,812,780 A * | 9/1998 | Chen ..................... G06F 11/261 709/224 |
| 10,384,133 B1 * | 8/2019 | Aghdaie ................. A63F 13/67 |
| 2007/0066403 A1 * | 3/2007 | Conkwright .......... A63F 13/803 463/43 |
| 2009/0102847 A1 | 4/2009 | Yabuki et al. |

(Continued)

FOREIGN PATENT DOCUMENTS

EP   1127599 A2   8/2001

OTHER PUBLICATIONS

Castro et al., "Churn Prediction in Online Games Using Players' Login Records: A Frequency Analysis Approach," IEEE Transactions on Computational Intelligence and AI in Games, current version Sep. 11, 2015, pp. 255-265, vol. 7, No. 3, XP011668810.

(Continued)

*Primary Examiner* — Steve Rowland
(74) *Attorney, Agent, or Firm* — Lerner, David, Littenberg, Krumholz & Mentlik, LLP

(57) ABSTRACT

A method of predicting a game objective completion time for a particular game objective for a particular user includes, for the particular user, determining a game objective completion time decile for a preceding predetermined number of other game objectives completed by the particular user, deriving a representative completion time decile from a plurality of game objective completion time deciles for the particular user, and identifying a time band classification of the particular user using the representative completion time decile for the particular user as input to a generated time (Continued)

band classification; and outputting predicted game objective completion time data for the particular game objective for the particular user based upon the identified time band classification.

15 Claims, 7 Drawing Sheets

(56) References Cited

U.S. PATENT DOCUMENTS

| | | | |
|---|---|---|---|
| 2009/0124371 A1* | 5/2009 | Gilmore | G07F 17/32 463/27 |
| 2013/0095928 A1* | 4/2013 | Boss | A63F 9/24 463/42 |
| 2013/0244791 A1* | 9/2013 | Albouyeh | A63F 13/60 463/43 |
| 2014/0243103 A1 | 8/2014 | Rom et al. | |
| 2015/0231502 A1* | 8/2015 | Allen | A63F 13/47 463/42 |
| 2015/0375120 A1* | 12/2015 | Lim | A63F 13/798 463/23 |
| 2016/0001181 A1 | 1/2016 | Marr et al. | |
| 2016/0067611 A1* | 3/2016 | Ware | A63F 13/537 463/29 |
| 2018/0243656 A1* | 8/2018 | Aghdaie | A63F 13/79 |
| 2019/0287340 A1* | 9/2019 | Oberberger | G07F 17/3244 |

OTHER PUBLICATIONS

Extended European Search Report with Written Opinion for Application No. 20196198.4 dated Dec. 22, 2020, 7 pages.

Koulieris, et al., "An Automated High-Level Saliency Predictor for Smart Game Balancing," ACM Transactions on Applied Perception, Dec. 8, 2014, pp. 1-21, vol. 11, No. 4, XP058062437.

Moura et al., "Visualizing and Understanding Players' Behavior in Video Games," ACM, 2 Penn Plaza, Suite 701, New York NY 10121-0701 USA, Aug. 10, 2011, pp. 11-15, XP058006724.

Shim et al., "Player and Team Performance in Everquest II and Halo 3," IEEE Potentials, Sep./Oct. 2011, pp. 21-26, vol. 30, No. 5, XP11359053A.

Wallner et al., "Comparative Visualization of Player Behavior for Serious Game Analytics," Serious Game Analytics, Advances in Game-Based Learning, 2015, pp. 159-179, XP055579018.

United Kingdom Combined Search Report and Abbreviated Examination Report for Application No. GB1915423.6 dated Mar. 30, 2020, 8 pages.

Kyong Jin Shim et al: "Player and Team Performance in Everquest II and Halo 3", IEEE Potentials. IEEE. New York. NY. US. vol. 30, No. 5, Sep. 1, 2011 (Sep. 1, 2011). pp. 21-26. XP011359053.

George Alex Koulieris et al: "An Automated High-Level Saliency Predictor for Smart Game Balancing", ACM Transactions on Applied Perception, Association for Computing Machinery. Inc, New York. NY. US., vol. 11, No. 4, Dec. 8, 2014 (Dec. 8, 2014). pp. 1-21, XP058062437.

Castro Emi Liano G et al: "Churn Prediction in Online Games Using Players' Login Records: A Frequency Analysis Approach", IEEE Transactions on Computational Intelligence and AI in Games. IEEE. USA. vol. 7. No. 3, Sep. 1, 2015 (Sep. 1, 2015). pp. 255-265. XP011668810.

Gunter Wallner et al: "Comparative Visualization of Player Behavior for Serious Game Analytics", In:"Serious Game Analytics", Jan. 1, 2015 (Jan. 1, 2015). Springer, XP055579018.

Dinara Moura et al: "Visualizing and understanding players' behavior in video games", Video Games. ACM. 2 Penn Plaza, Suite 701, New York NY 10121-0701 USA, Aug. 10, 2011 (Aug. 10, 2011), pp. 11-15, XP058006724.

Extended European Search Report for EP20196198.4 dated Dec. 22, 2020; 7 pages.

* cited by examiner

APPARATUS AND METHOD OF USER ANALYSIS AND CONTENT SELECTION

CROSS-REFERENCE TO RELATED APPLICATION

The present application claims priority from United Kingdom Patent Application No. 1915423.6, filed on Oct. 24, 2019, the disclosure of which is hereby incorporated herein by reference.

BACKGROUND

The present invention relates to an apparatus and method of user analysis and content selection.

Video games are played by people across all demographics, and consequently are played by people with many different lifestyles. For example, some people may be able to devote an entire day to playing a game, whilst others may sometimes only be able to fit in a short period of time in which to play.

SUMMARY

It has been recognized that people with limited available time will still wish to have a fulfilling gaming experience, across a broad range of games. The present invention aims to address or mitigate this problem.

In a first aspect, a method of predicting a game objective completion time for a particular game objective for a particular user is provided in accordance with claim 1.

In another aspect, a server operable to predict a game objective completion time for a particular game objective for a particular user is provided in accordance with claim 14.

In another aspect, a system is provided in accordance with claim 15.

Further respective aspects and features of the invention are defined in the appended claims.

BRIEF DESCRIPTION OF THE DRAWINGS

Embodiments of the present invention will now be described by way of example with reference to the accompanying drawings, in which.

DETAILED DESCRIPTION

An apparatus and method of user analysis and content selection are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

An apparatus implementing a method of user analysis and content selection may take the form of a user's videogame console device for hosting playable videogames, a server operable to communicate with such a user's videogame console via a network, or a combination of the two.

Hence for the purposes of explanation a videogame activity search apparatus may take the form of a Sony® PlayStation 4® or PlayStation 5 ® entertainment device, operating under suitable software instruction.

Figure 1:
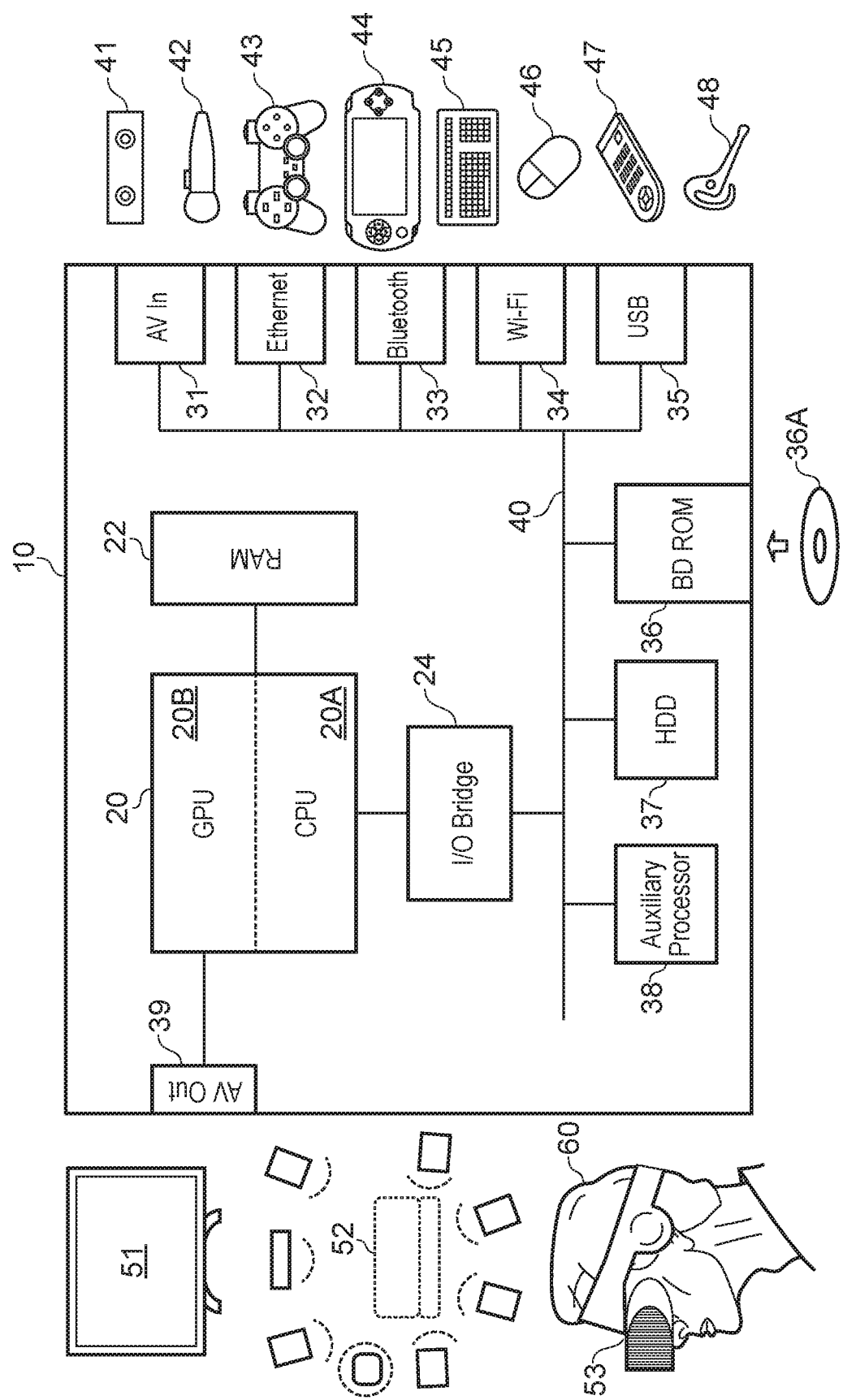
FIG. 1 is a schematic diagram of an entertainment device in accordance with embodiments of the present description.

FIG. 1 schematically illustrates the overall system architecture of the Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51.

Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

Figure 2:
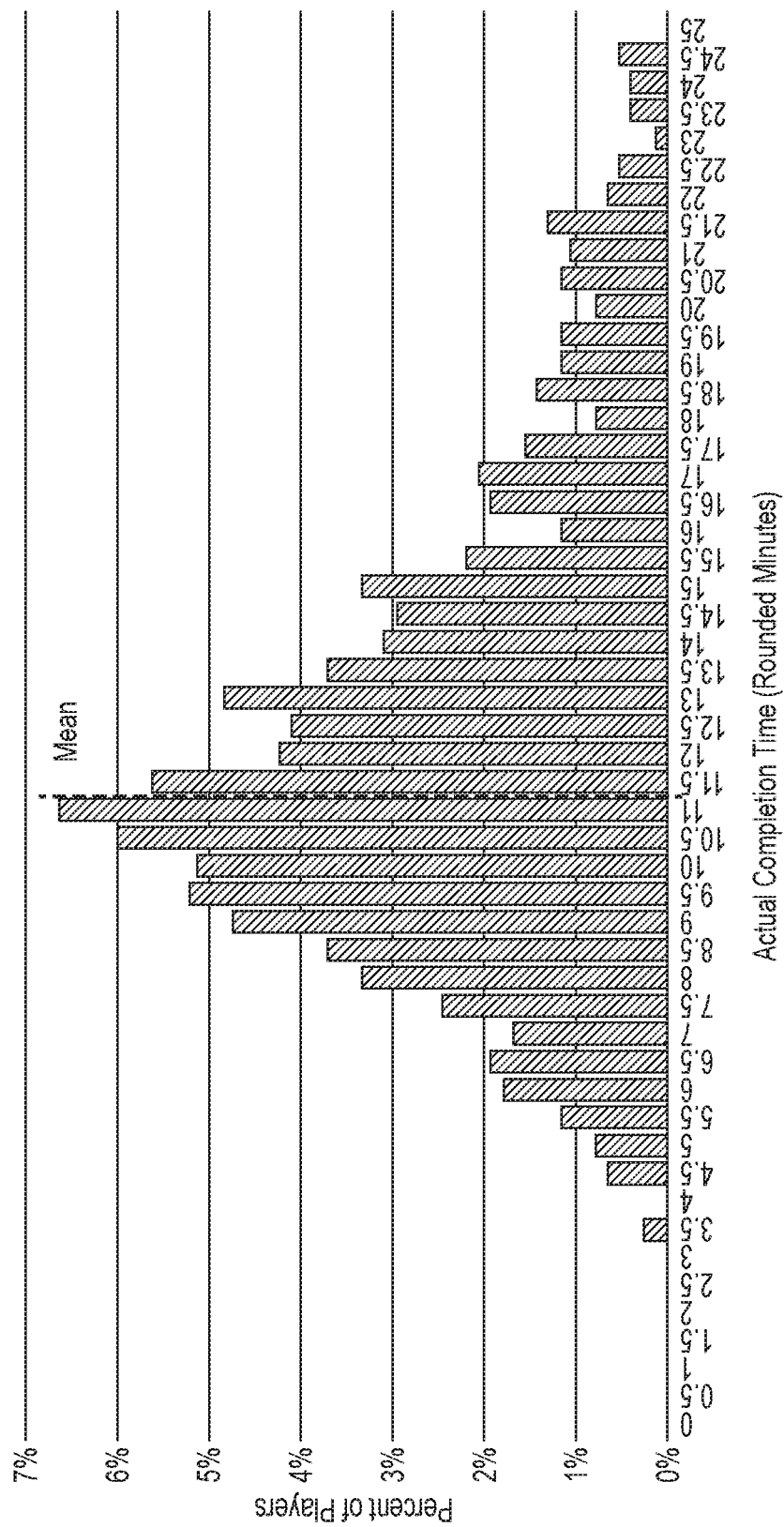
FIG. 2 is a schematic diagram of game objective completion times for a game objective, in accordance with embodiments of the present description.

Referring now to FIG. 2, embodiments of the present description relate to estimating how long a player would take to complete a given task (i.e. game objective) within a game. This is useful in enabling a player to judge what task might best fit into their schedule, or to promote or select a suitably timed task for a user who has stated that they want to play for a specific period, or to promote or select a suitably timed task for a user who has a time limit imposed on their play (for example due to parental controls). In the following, the terms 'task', 'game objective', 'quest' and 'sub-quest' are used interchangeably to mean a part of a game with a defined start condition and end condition.

FIG. 2 shows a distribution of completion times for a particular task in an example game (in this case Horizon Zero Dawn®). The completion times are in-game elapsed time, rather than absolute time, and so may for example span several game sessions over several days, whilst only adding up to 25 minutes in-game elapsed time.

It can be seen in FIG. 2 that there is a wide distribution of times. Consequently if simply the mean completion time (10 mins 54 secs) is obtained, there will be a lot of players for whom this is inaccurate; the mean average error in this case (i.e. the average error size, whether too short or too long) is 6 mins 13 seconds; which is of similar magnitude to the original estimate, making that estimate poor.

Clearly therefore the average time for players who have completed a task is a poor predictor of play duration for any given individual player.

It is possible that other aspects of gameplay may contribute to a better estimate of completion times, such as for example the user's accuracy (e.g. more accurate shooting means defeating the enemy more quickly), or the number of objects collected by the user (e.g. if the user has spent time collecting more treasure, this is likely to make their task take longer).

For the example game Horizon Zero Dawn®, data was collected for 10,000 players comprising their completion times for a number of tasks, as well as a set of variables recorded up to the point where each given subsection commenced, to provide predictive input.

As a nonlimiting example, the variables used were as follows:

TABLE 1

Example variables that may influence game objective completion times

| Variable | Description |
| --- | --- |
| Kill Count - Total | The number of kills the player had achieved |
| Kill Count by Entity (%) | Of all kills the player had achieved, the percentage of which has been achieved against each Entity in the game. Percentages are used to normalise across players with different kill counts |
| Kill Count by Property (Zoomed, Headshot, Crouched) | Of all kills the player had achieved, the percentage of which has been achieved while in each property state |
| Death Count | The number of times the player had died |
| KDR | Kill:Death ratio |
| Player Level | The in game player level |
| Number of quests completed | How many quests had the player already completed in the game |
| Quest completion rate | Of the quests the player had attempted, what proportion had been completed |
| Quests completed per hour of game time | How many quests had the player already completed in the game divided by game-play hours |
| Quest speed decile across all completed quests | Averaged across all prior completed quests, how fast was the player vs all other players (put into decile form to limit outliers) |
| Quest speed decile across latest 10 quests | Averaged across the players ten most recently completed quests, how fast was the player vs all other players (put into decile form to limit outliers) |
| Item count | The number of items the player had collected in the game |
| Item count by type (%) | Of all items the player had collected, the percentage which were of each type (i.e. health, weapons, ammo) |
| Distinct count of Perks added | The number of unique perks the player had added |
| Perks added flag | A series of binary flags showing which perks the player had added |
| Attack Count | The number of attacks a player had inflicted |
| Attacks by weapon | Of all attacks the player had inflicted, the percentage of which has been inflicted using each weapon |
| Distinct weapon count | The number of unique weapons the player had used |
| Distinct damage type count | The number of unique damage types the player had used |

TABLE 1-continued

Example variables that may influence game objective completion times

| Variable | Description |
|---|---|
| Attacks by damage type | Of all attacks the player had inflicted, the percentage of which has been inflicted using each damage type |
| Trophy count | The number of trophies the player had achieved in the game |
| Trophy achieved flag | A series of binary flags showing which trophies the player had achieved |

It will be appreciated that different games may have different variables, but that these variables may fall into basic groups relating to speed and/or proficiency at defeating enemies, amount of noncombat activity (e.g. item collection, non-player character interaction), and historical quest completion speed.

Given the above variables, a linear regression model was used to identify the relationship between these input variables and an output variable (quest completion time). The model takes account of all input variables, and assigns each a weighting which affects the slope of the line of best fit, with the overall goal of finding a set of weights that reduce error (actual quest completion time versus predicted quest completion time as much as possible).

Figure 3:
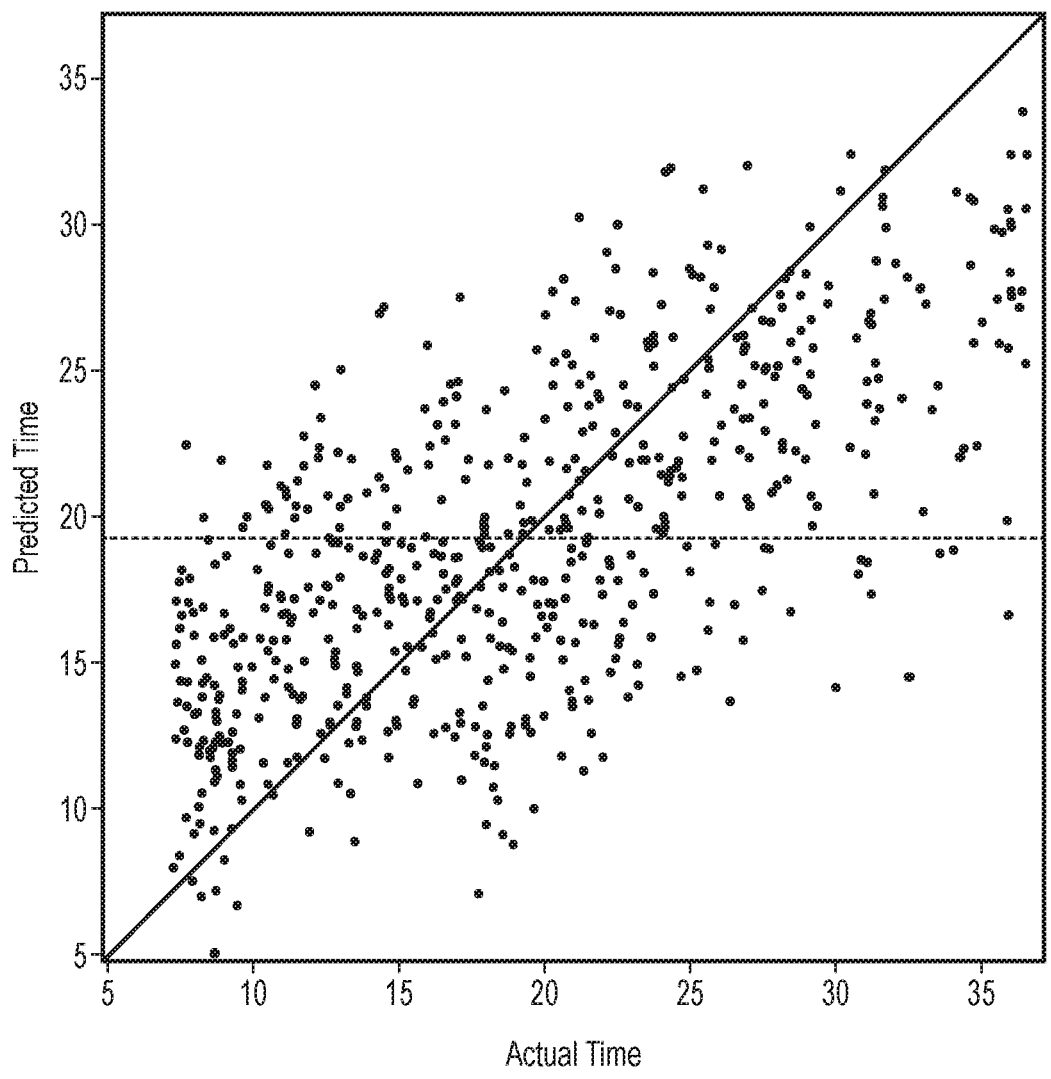
FIG. 3 is a schematic diagram of a linear regression analysis of in-game variables with respect to predicted game objective completion times for a game objective, in accordance with embodiments of the present description.

FIG. 3 illustrates predictions based upon the linear regression model, with the ideal outcome illustrated by the diagonal line. Whilst it can be seen that there is some relationship between the above variables and the object of completion time, it is noisy and only loosely clustered around the ideal outcome with a number of predictions a significant distance from the actual completion time.

The mean absolute error these predictions was 6.01 minutes, compared to 6.22 minutes when based on the average completion time for the quest itself.

This indicates that the problem of prediction for this particular task is likely to be very difficult.

A significant factor is the inherent variability that arises from the combination of providing a potentially rich and engaging environment in which to complete a quest, and the different styles and behaviours of players when engaging with that quest, not only within a cohort of players, but potentially also for an individual player depending on when and where they are playing, their mood, other distractions in the environment, and the like. Some of these factors may be impossible or impractical to measure or predict, and so it is likely that there will always be a degree of error in the predictions made.

However, it may nevertheless still be possible to improve the predictions further.

It was noted when investigating the linear regression technique above that the majority of the predictive power of the model came from the 'quest speed decile across latest 10 quests' input variable. In other words, the speed at which players recently completed objectives (with respect to the wider player corpus) was the best individual metric for predicting future game objective completion times.

Accordingly, in an embodiment of the present description, a time band classification is performed with the intention of identifying whether a user falls for example into a fast, medium or slow category of player. Subsequently the completion time for a quest can be predicted using the average completion time for the quest for a corresponding fast, medium or slow cohort of players.

Hence by separating out one of the strongest predictors of quest completion time, namely historical quest completion time, into smaller ranges, the estimation errors arising within each category range should also become smaller.

The time band classification can be performed using a random forest technique.

Alternatively however, the time band classification can be performed using a conditional inference tree. In particular, a dynamic time band classification can be performed using a conditional inference tree.

A conditional inference tree is a type of decision tree that iteratively searches for split points within the values of an input variable, and splits only when it meets a statistical confidence threshold in the corresponding output variable (e.g. the variable that is to be subsequently predicted). Once the best split point has been found (e.g. the one with the highest significance score), it then repeats this process within the data on either side of that split, looking for further splits that meet the statistical confidence threshold.

It continues this process until it cannot find any more splits. This process is known as recursive partitioning.

This approach may be used for a given game objective (e.g. quest, partial quest, level completion, boss battle, or any similar in game objective with a measurable start status/condition and end state/completion condition), by analysing a score relating to players' completion speeds for recent objectives and searching for splits within these values, isolating split points where there is a significant difference in the completion time for that objective. This is described in more detail later herein.

Once the recursive partitioning is complete, the final split points form 'buckets' or output nodes for performances, which can be used for predictions. The buckets and key metrics for each game objective can then be saved and used to generate personalised time estimates in response to a request for a given player.

An advantage of this technique is that due to the generation of split points, the output nodes are created dynamically and so the scale or quality of the predictions can improve with the scale or quality of available data. For example the system may offer a single prediction (the overall median) when provided with noisy data, but provide very granular and accurate predictions for different distinct groups of players when the data indicates that these exist.

In other words, for a game where there is no strong correspondence between player capability, style, or circumstance and game objective completion times (perhaps for example due to an innate random property of the game itself), then without any significant split the technique may devolve to the overall average as described previously, but where there is a strong correspondence between capability, style or circumstance within the player cohort and game objective completion times, this will be reflected in the classification tree, creating game objective completion time prediction data corresponding to different subsets of the player cohort.

Applying the same process to a given player to identify the appropriate corresponding subset then allows for a more accurate prediction of their completion time based upon the mean completion time for that subset of the player cohort.

As noted previously, the relative completion time performance of players in a set of N previous quests was of particular predictive value. Hence in embodiments of the present description, the input variable for the time band classification should be based on these relative completion time performances, although this is non-limiting; optionally alternative variables, or a version of this variable weighted according to values of one or other variables may similarly be considered.

For a time based variable such as relative completion time, it will be appreciated that different objectives will take different amounts of time, and furthermore that the distribution of absolute completion times may vary significantly for different quests. Accordingly, if it is desirable to predict completion times based upon, for example the last N quest completion times, then it is preferable to normalise the values from respective quests so they can be compared with each other.

Consequently instead of using the actual time in which players complete the previous objectives, players are placed into a decile (a ranked value from 1 to 10) based on how fast they completed an objective compared to other players who have completed the same objective.

This will result in N decile scores for the previous N quests. The value of N may be any suitable number. Initially in a game no quests will have been completed for the given player; in this case a 'neutral' decile (decile 5) may be assumed for the N quests (although see variant embodiments later herein). As the game progresses, the number of completed quests increases up to and beyond the target value for N, replacing older values. N may be any suitable value between for example 1 and 100. However, more preferably the value of N is between 4 and 20, or more preferably between 6 and 15, or more preferably between 8 and 12, or more preferably 10. In this manner, the N (e.g. N=10) decile scores represent a recent history of the relative completion speed of game objectives by the player in the game compared to others in the corpus/cohort.

The player may then be characterised by an average of their current N decile scores. Hence for example if a player's most recent 10 deciles were (4, 2, 4, 2, 3, 1, 1, 9, 1, 2), then their average decile score would be 2.9, and this can be used as the predicted decile score for the next attempted quest.

It will be appreciated that other analyses may be performed, such as a linear or curve fit to the N deciles, to predict any upward or downward trend in the decile values for the N+1 quest (the quest under investigation). An upward trend may be present where a user is improving faster than the average learning curve for a game (for example early in the game, or where a new ability is introduced during the game), and may also be relevant early in the game where decile values have been assumed but underestimate the player. A downward trend may be present where the user is experiencing difficulties compared to their peers (for example later in a game where combat is more complex, or puzzles are more difficult), and may also be relevant early in the game where decile values have been assumed but overestimate the player.

Hence for example the recent 10 deciles listed above show a general upward trend from slightly above the $4^{th}$ decile to slightly below the $1^{st}$ decile, despite one outlier in the 9th decile. In this case a linear fit may predict a decile score of 1.9 for the next attempted quest, rather than the average of 2.9. This may be a more accurate prediction of the user's comparative performance in the quest under investigation.

Hence a indicative/representative decile score can be determined for any player at a point at which they are about to commence a given game objective. Accordingly, to predict completion times for a given player, representative decile scores for a cohort of players who then completed the game objective can be used as inputs to the conditional inference tree, with the actual completion times for the game objective as the outputs.

The conditional inference tree then iteratively searches for split points within the input indicative decile scores for the cohort of players, and splits only when it meets a statistical confidence threshold (significance test) in the output variable (actual completion time). As described above, it then searches again for splits on either side of the first split in a recursive manner, until no more splits have been found.

Figure 4:
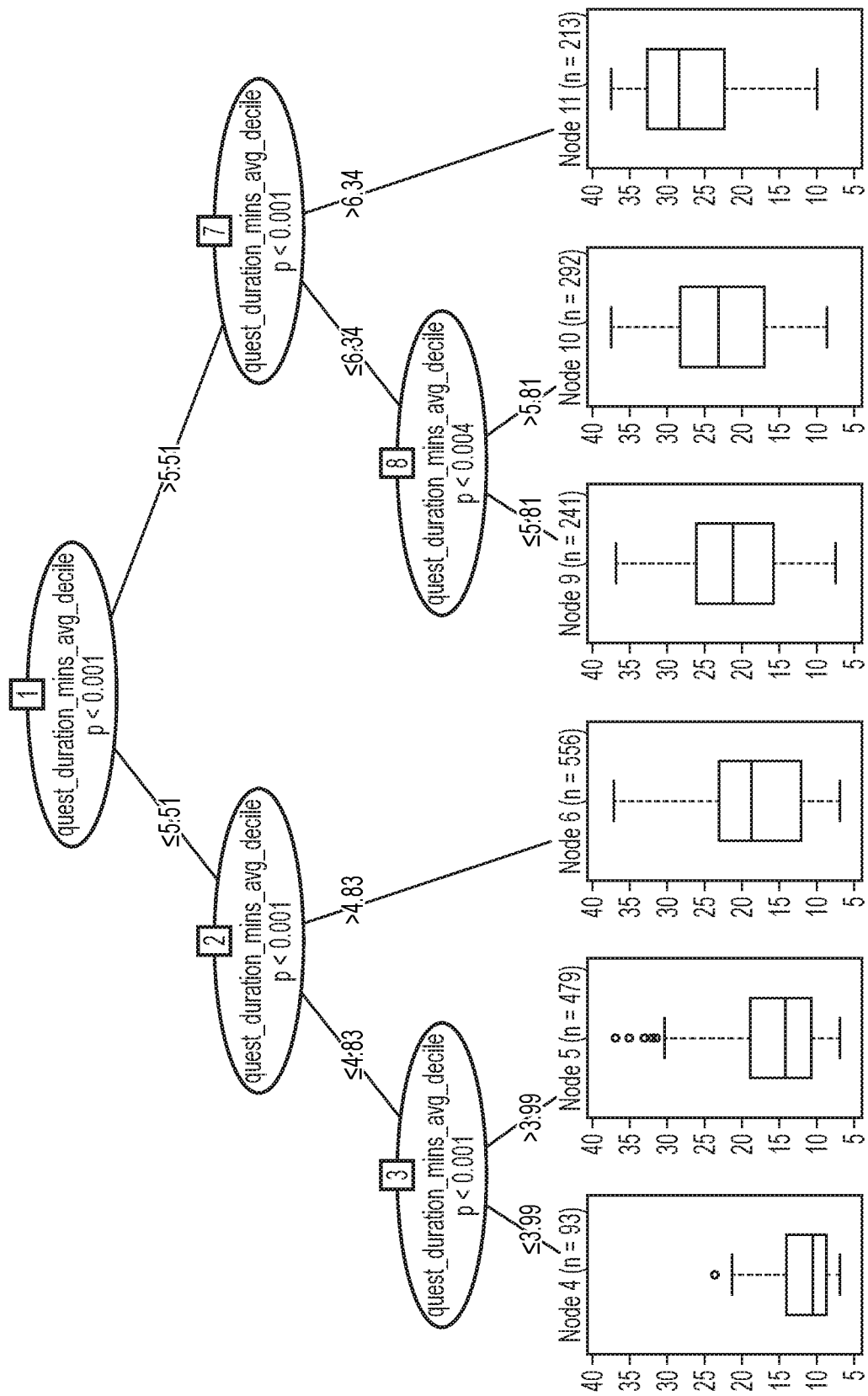
FIG. 4 is a schematic diagram of a conditional inference tree for representative deciles for a corpus of users, in accordance with embodiments of the present description.

Referring to FIG. 4, this illustrates the recursive tree generated by the technique for an example set of input representative decile scores for a cohort of players. At node [1] the data is split into two sets based on the significance test for the output data (described later herein), where the average docile was ≤5.51 or >5.51. The tree continues with the left branch and at node [2] splits again into subsets where the average docile was ≤4.83 or >4.83; the tree again starts with the left branch and at node [3] splits once more into subsets where the average docile was ≤3.99 or >3.99. The tree starts again with the left branch and this time there is no further split detected, resulting in a first output node [4] (or 'bucket' as described elsewhere herein) for a subset of the input indicative decile scores ≤3.99, corresponding to a mean output game objective completion time of 11.7 minutes.

The tree then returns to the right branch of node [3], and again there is no further split, resulting in another output node [5] for a subset of the input representative decile scores >3.99 and ≤4.83, corresponding to a mean output game objective completion time of 15.2 minutes.

The tree then returns to the right branch of node [2], and in this case there is again no further split, resulting in another output node [6] for a subset of the input representative decile scores >4.83 and ≤5.51 corresponding to a mean output game objective completion time of 18.4 minutes.

As illustrated in FIG. 4, the recursion continues and generates three further output nodes [9], [10], [11] for subsets of the input cohort taking progressively longer on average to complete the game objective.

The splits at each of nodes [1], [2], [3], [7] and [8] were determined using a statistical significance test, which provides a confidence score for the completion time on one side of the split being different to a completion time on the other side. The test preferably takes account of both the difference in completion times and the number of data points (input representative decile values) available.

Given the noted complexity of contributing factors influencing completion times, it can be assumed that the completion times are approximately normally distributed. Accordingly, a known significance test referred to as a t-test can be used. See for example http://statstutordevelopment.lboro.ac.uk/resources/uploaded/unpaired-t-test.pdf.

This tests a candidate split point (e.g. a given decile value) and for each resulting group (i.e. the groups to the left and right of the split) uses the size of the group and the mean and standard deviation of the completion times for those groups to calculate a p-value (a probability) that the two groups have different mean completion times.

Figure 5:
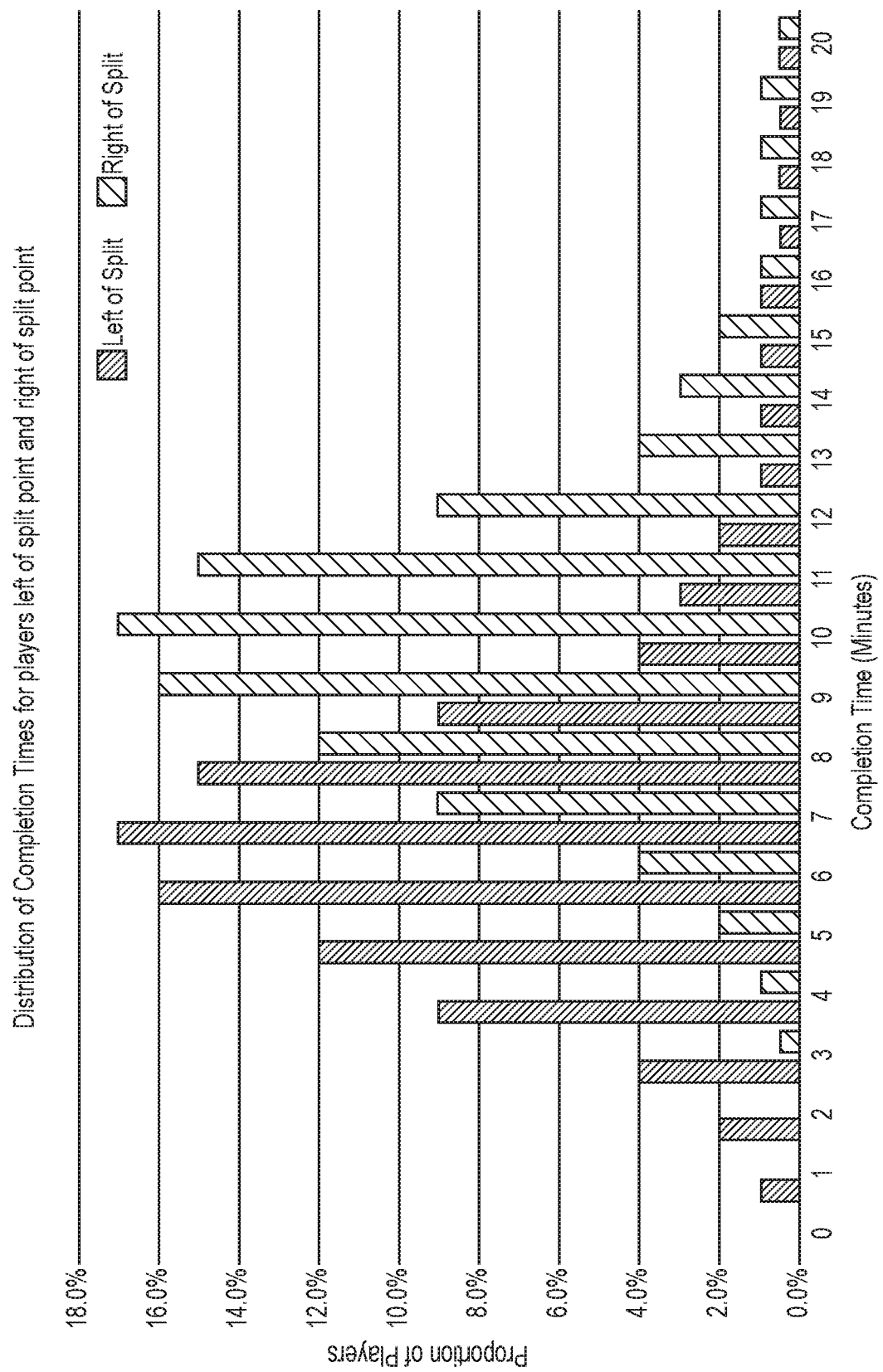
FIG. 5 is a schematic diagram of a significant split in distributions as detected by a t-test, in accordance with embodiments of the present description.

FIG. 5 illustrates such a split, with different respective distributions for the groups on the left and right of the split point.

When the p-value reaches a predetermined threshold (the p-value can either be above a threshold or below a threshold, depending on how the probability is defined—e.g. probability of different outcomes should be high or equivalently probability of similar outcomes should be low), a split is identified and the groups to the left and right of the split are separated. Stated crudely, the p-value characterises the likelihood of there being separate mean values for the groups, given the rate of drop-off between the means (corresponding to the standard deviation) and the statistical significance and hence reliability of these values (corresponding to the group size used to generate the mean and standard deviation).

Split points may optionally be searched for sequentially (e.g. for each distinct value in the average speed decile); alternatively, to potentially speed up the search, split points can be searched for by iterative division of these values; jump to the middle value the value ½ way though the set) and detect a split; if there is a split, drop back to the middle of that half (the value ¼ way though the set) and detect a split; if there isn't a split, jump up to the middle of that quarter (the value ⅜ way though the set) and detect a split, and so on, until the first value through the set to indicate a split is found. This process may then be repeated for the resulting left and right groups. This approach will typically significantly reduce the number of candidate split values.

In any event, the result is a set of 'buckets' or output nodes for respective ranges of average deciles, which comprise respective means and standard deviations for the corresponding completion time results for the players whose average deciles fall into the respective bucket.

For the tree in FIG. 4, the results are:

TABLE 2

Completion time statistics for the buckets/nodes generated in the example dynamic time band classification
Game Objective Completion Time Statistics (Minutes)

| Bucket # | Mean | Lower Quartile | Median | Upper Quartile |
|---|---|---|---|---|
| 4 | 11.7 | 8.7 | 10.4 | 14.0 |
| 5 | 15.2 | 10.5 | 14.1 | 18.8 |
| 6 | 18.4 | 12.1 | 18.7 | 23.0 |
| 9 | 21.2 | 15.8 | 21.1 | 26.0 |
| 10 | 23.2 | 17.0 | 23.0 | 28.3 |
| 11 | 27.1 | 22.4 | 28.4 | 32.6 |

Hence for a player A who had an average decile score of less than 3.99 in the previous N objectives (in other words, on average they were in the top 39.9% of the cohort for average completion times), it is predicted that they will complete the target objective in a time of 11.7 minutes, whereas for a player B who had an average decile score of greater than 6.34, it is predicted that they will complete the target objective in 27.1 minutes.

Furthermore, it will be appreciated that the approach can generate lower and upper quartiles for the distribution of times in each bucket, thereby providing a realistic time range for completion of the game objective by the user, that varies for the different mean completion rates.

Hence player A could be predicted to complete the objective in a time between 9 and 14 minutes, whilst player B could be predicted to complete the objective in a time between 22 and 33 minutes.

This allows a realistic evaluation of the time it will take to complete the game objective.

The mean absolute error for this dynamic time band classification approach using conditional inference trees is 4.6 minutes, compared to 6.22 minutes for the overall average. This represents a considerable improvement.

However it will be appreciated that the mean absolute error improves further for those players not in buckets 9, 10, or 11 (in this example), who are the slower players for whom a larger number of influences and causes of delay both inside and outside the game are possible contributors to their overall time. For those players in buckets 4, 5 and 6 (in this example), who are the faster players, there is a greater likelihood that their completion time for the game objective is based primarily on their in game performance without external interruption or persistent error, and so more directly correlates with gameplay. Hence there is a likelihood that the mean absolute error for completion time estimates for focused or proficient players is likely to be much better than 4.6 minutes.

Hence in addition to an overall improvement in mean absolute error, the present approach can provide further improvement in a mean absolute error for the prediction of completion times for those users more likely to complete the objective more quickly. This also means that the mean prediction error as a proportion of the associated overall completion time is more consistent between the buckets than the mean prediction error derived from a global average.

VARIANT EMBODIMENTS

The above examples were based on the mean of N decile scores for the previous N quests. As noted previously, optionally the input variable could be a linear or other prediction of the N+1 decile score, to capture any trend in the N decile scores for the previous N quests; this may more accurately define the cohort of players with respect to the game objective (which is the N+1$^{th}$ quest), and so provide better statistics for the classification and the split decisions, resulting in more splits and/or better positioned splits and so further reducing the mean absolute error in prediction per bucket/output node.

The analysis of the current player could then similarly be based upon a linear or other prediction of their N+1 decile score to identify the relevant output node/bucket from which to obtain the game objective completion time statistics.

Similarly optionally, as was noted above the completion time for the previous N quests is a strong predictor of the completion time for the N+1 quest but is not the only predictor. Accordingly, an input value based upon a combination of completion time decile and some other metric, such as ratio of kills to shots fired, damage taken, objects collected or the like, or more generally indicators of a player's efficiency in completing the objective, may be used in conjunction with the average or predicted completion time decile to generate a conditional inference tree. Hence for example the above metrics may be used to generate an efficiency score, normalised to the average (so that for example the average equals one), and multiplied with the average completion time decile to promote efficient players and demote inefficient players within the input value distribution.

Alternatively, the conditional inference tree could be based upon average or predicted completion time deciles as described previously herein, but where a bucket spans more than a threshold period of time, the cohort of users corresponding to that bucket are subjected to a second conditional inference tree based upon a further metric, such as an indicator of player efficiency as discussed above, to further separate the cohort into one or more subsets, if statistically significant subsets exist.

Hence for example whilst the first bucket [4] has a quartile range between 8.7 and 14, which is relatively small, it nevertheless covers the potential value range between 0 minutes (or more realistically, the fastest time or the time range for 'pro' players) up to approximately 14 minutes. This is a comparatively large range compared to buckets 5, 6, 9 and 10.

Hence the group corresponding to the first bucket [4] may be subjected to this supplementary conditional inference tree process, and for example split into two subgroups, for example resulting in mean completion times of 8 and 13 minutes respectively, and with quartiles that span respectively smaller ranges, thereby improving the prediction accuracy for these groups.

Similarly the last quarter bucket [11] covers most times from approximately 25 minutes onwards, which depending upon the dataset may be a large period of time (for example, a number of players may take up to an hour). Hence again the group corresponding to this last bucket [11] may be subjected to this supplementary conditional inference tree process, and for example split into a number of subgroups potentially differentiating between those who attempt to complete objectives in a focused manner but do so badly (for example with a poor hit rate or high level of damage) and those who do not complete objectives in a focused manner (for example by instead collecting large amount of treasure not directly related to the objective). This may again improve the prediction accuracy for slower players.

It was previously noted that not all quests/game objectives are the same, and it is for this reason that time completion deciles are computed, to remove the inherent differences in absolute time for completion from the inputs to the conditional inference tree. However similarly because not all quests/game objectives are the same, it is possible that different factors within a given game objective contribute to the completion time, depending on the nature of the game objective.

Hence for example a quest relating to collecting four pieces of treasure may be performed well by people who are good at solving puzzles or are particularly observant, whilst a quest relating to eliminating 50 opponents on a battlefield may be performed well by people who have good reflexes or accuracy; a game that presents a variety of such quests in a relatively random order (or an order that is selectable by the user) may therefore result in a set of N deciles that are not necessarily reflective of the likely completion time of the next quest, depending on whether it relates to finding more treasure or defeating more opponents.

Accordingly, optionally different sets of N deciles may be calculated for different types of quest, with the quests being classified according to simple categories; categories may include finding objects/people, reaching locations, defeating enemies, and so on, and the appropriate set of deciles for the quest whose completion time is to be predicted may then be selected for use according to any of the techniques described elsewhere herein.

It will also be appreciated that basing the conditional inference tree analysis on a large cohort of players who have previously completed the game objective allows for a statistically robust analysis, but much like the global mean value described above, a cohort of all such players, or a random subset of such players, effectively models a global mean player. Hence optionally, as the number of records increases due to increasing numbers of players, it is possible to select a targeted subset of players to form the cohort; this may be done from a player and/or game perspective.

From a player perspective, this may involve selecting players of a similar age to the requesting player's own registered age. Similarly, it may involve selecting players with a similar playing style; this may be inferred from the degree of overlap of games in respective libraries, or degree of overlap of recently played games, and/or based on overlap of trophies (or classes of trophies) awarded to players, which typically reflect different in-game behaviours such as preferring melee battles or sniping, or preferring combat or stealth.

From a game perspective, this may be done for example at a simple character class level; in a game where a player can choose different character classes such as magician or barbarian, a given quest may be of a different effective difficulty for these different character classes, for example due to having to take different routes to a goal due to different capabilities, or being proficient at dispatching enemies whilst being less proficient at solving puzzles, or vice versa. Hence a corpus of a subset of players with a character class similar to that of the current player may be expected to result in a conditional inference tree that provides a better estimate of play completion time than random or total corpus of players. It will be appreciated that potentially the closer the in-game state of selected members of the corpus are to those of the current player, the more representative the results will be. Hence optionally a statistically significant corpus (i.e. corpus of sufficient size to provide good results from the conditional inference tree) may be grown by preferentially choosing players whose in-game state or circumstance is closest to the user, and then widening the selection away from this initial point until the desired corpus size has been achieved.

Of course, it will be appreciated that this implies a bespoke corpus selection and generation of a conditional inference tree for the given user, which may be computationally expensive if provided for many users; hence the user themselves may be similarly classified to a preferred approximation e.g. just age, or just character class, or character class and level, or current class, level, and equipped weapons, or any suitable combination that enables a finite set of corpora and conditional inference trees to be generated in advance, and later selected amongst to generate the prediction for the current player.

In a similar manner to the above, the user's average predicted decile is based upon the completion deciles for the N previous quests. This is then used in a conditional inference tree that has been grown based on similar average or predicted deciles for a corpus of players who have then completed the game objective under investigation. However, the odds that they completed the same N previous quests (and the next quest under investigation) in the same order as the current player may be small; hence whilst their average or predicted decile may be based on the last N quests they completed, these may not all be the same quests; consequently the resulting set of deciles may not be as representative as they could be. Hence optionally a corpus for use in generating a conditional inference tree may be formed from a subset of players whose quest completion sequence is closest to that of the current player, preferentially starting with all quests being the same, and where this results in fewer than a threshold number of players in the corpus, adding further players with quests differing the least, and preferably (for example in the case of predicting a decile) amongst the oldest quests in the set of N quests (for example adding players with variations in the oldest quest, and then also the next oldest quest, and so on), until a sufficient number of players exist in the corpus. It will be appreciated that this approach requires the quests to be identifiably associated with the records for the N deciles.

Again it will be appreciated that this implies a bespoke corpus selection and generation of a conditional inference tree for the given user, which may be computationally expensive if provided for many users. However, games are frequently structured to have clear paths of progression, or may have a number of quests associated with a particular location, resulting in certain sequences or combinations of quests being commonplace. Accordingly, conditional inference trees may be generated for corpora of players having the most common quest sequences or (where an average rather than prediction is required) combinations of quests, and the conditional inference tree corresponding to the closest fitting sequence or combination of last N quests for the current user may then be selected to predict the completion time for the next quest.

If quests/game objectives can be classified, then in principle a set of N deciles for a given class of quests/game objectives can optionally be assembled from a plurality of games. This may be of use for example when a player has not completed enough quests within one game to obtain a representative average or prediction (for example where more than a predetermined proportion of the N deciles would otherwise have to be assumed, for example as decile 5). Similarly, an average or predicted decile of the user from one game may optionally be used instead of an assumed set of deciles for another game; for example the first N actual deciles of one game may be used as the initial assumed deciles for a new game. To improve the representative nature of these imported deciles, they may be chosen from a game of the same genre, or for games in a series, the previously played game in the series.

The recorded completion times for quests/game objectives are typically based on when a start condition and an end condition occur. However, a user may not be immediately at the requisite start condition; for example a quest may require first speaking to a non-player character, or equipping a particular item, which may be distant to the user within the game. Accordingly, the predicted completion times may have a period added to them which comprises a predicted time to reach the start condition for the game objective; for example the time expected to traverse the game environment to reach the start condition (or to use a fast travel mechanism to reach a closest waypoint and then traverse the game environment to reach the start condition), or to equip the relevant item, and so on.

Similarly, where a user has partially completed a quest and is now resuming their play, their elapsed time can be deleted from the predicted completion time. If their elapsed time already exceeds the predicted time, or is already within the slowest decile, then optionally no prediction is given.

It will be appreciated that any suitable combination of the above variants may be used together.

Outputs

Results for a given game may be provided within a dedicated quest selection menu within a game; hence for example when a user selects active or available quests, the predicted time for the users complete the quest may also be provided, enabling the user to make an informed selection as to which quest to pursue.

Alternatively or in addition results from a given game may be provided in conjunction with an icon for that game made available by the operating system of the entertainment device. For example one or more game objective names may be provided together with a predicted time to completion near to the icon.

Alternatively or in addition results from a given game may be provided when an icon for that game is hovered over or selected in such a manner that further details are provided to the player (such as for example trophies earned, other friends playing the game, and so on), thereby providing additional information to assist the user in evaluating whether to play the game at that point.

The number of quests currently available within a game are likely to be large and it may be preferable not to evaluate or display all of them in this manner. Accordingly, quests that are currently open within the game (i.e. quests actively selected for completion by the user) may be prioritised, as may quests whose start condition is geographically proximate to the user within the game or which may be started without relocation by the player, as these minimise the scope for interfering factors reducing the accuracy of the time estimate.

Optionally, a user may be able to specify a preferred playing time within a user interface of the game itself or the operating system (for example, a user may know they only have half an hour available, or parental controls set a play time limit); the game or the operating system may therefore prioritise those quests that can be completed within half an hour; for example those games whose predicted mean or preferably upper quartile for the player is less than 30 minutes. Using the upper quartile reduces the chances of the player being unable to complete the quest within the specified time, given the nonzero mean absolute error. Typically those having a completion time or upper quartile closest to, but less than, the target time with have the highest priority.

Optionally, where a user specifies a preferred playing time (either themselves or as a consequence of parental control), games with quests/objectives predicted to take the preferred playing time to complete may be highlighted to the player to enable their selection; this reduces the need for the user to hunt through their games searching for appropriate activities, given that their available playing time may already be short.

Optionally, where a user specifies a playing time (or has it specified for them e.g. by parental control), then a game may provide the user with the option to open the game and automatically activate the relevant game objective; the game may then continue in a conventional fashion, with whatever in-game mechanisms are used to guide completion of the active game objective being directed to this game objective.

Hence in an example embodiment a user may tell the entertainment device that they have for example half an hour to play (or they may have half an hour based on parental controls); the entertainment device promotes and/or highlights which games have a game objective that will take half an hour to complete, optionally factoring in the time taken to reach the start of the quest, optionally prioritising quests/objectives that are already open or are near to the user's in-game location, and optionally opening the game (for example using the most recent game save) with that quest made active.

Finally, it will be appreciated that references herein to 'deciles' are merely representative, and any suitable division may be considered to normalise input values, such as quartiles or centiles. Hence references to 'deciles' herein should be understood to be equivalent to any suitable alternative division.

System

Figure 6:
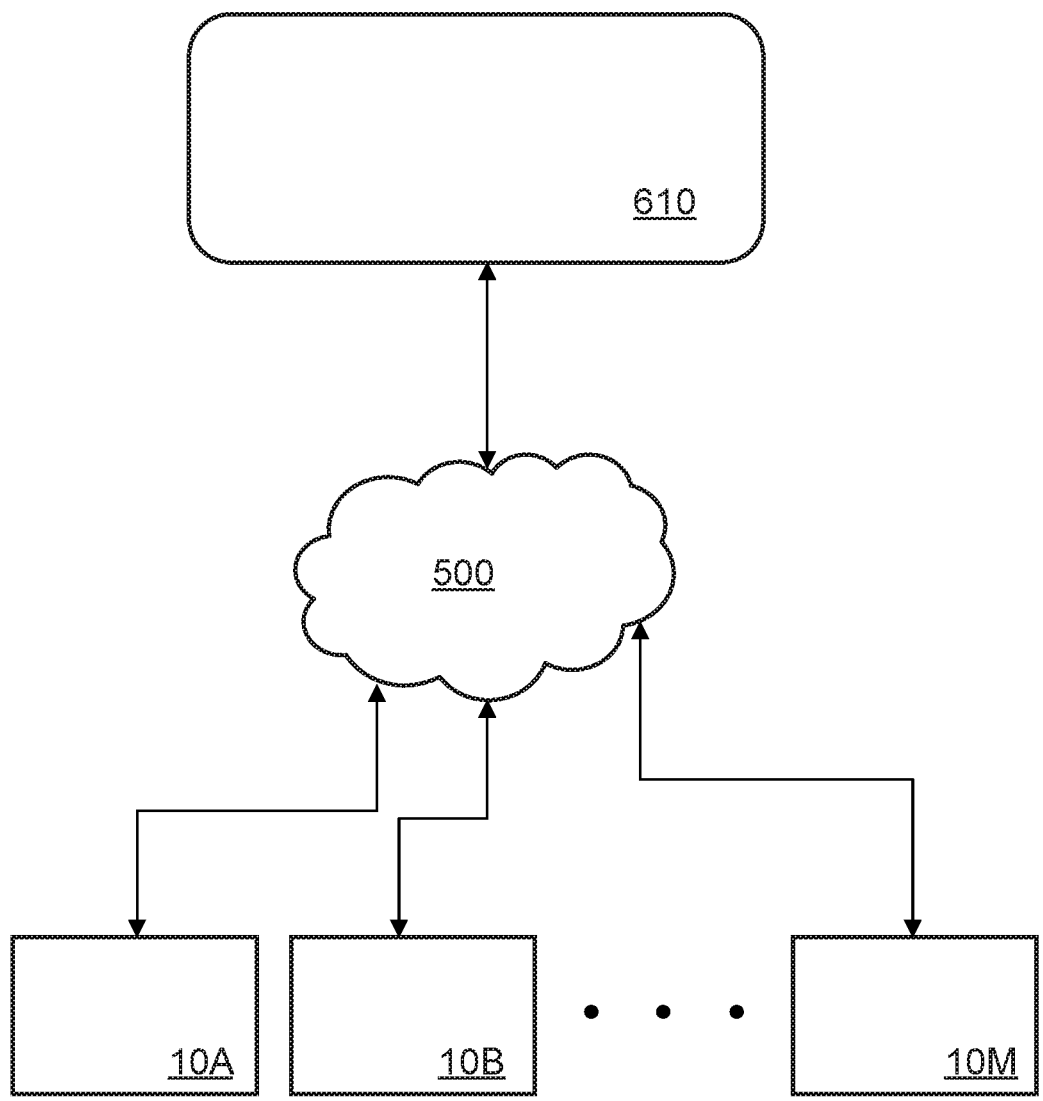
FIG. 6 is a schematic diagram of a system for to predicting a game objective completion time for a particular game objective for a particular user, in accordance with embodiments of the present description.

Referring now to FIG. 6, a system for implementing the above techniques may comprise a server 610 connected to a plurality of client entertainment devices 10A, 10B, ..., 10M via a network 500 such as the Internet.

Game objective completion telemetry is uploaded from the client entertainment devices to the server, thereby creating the corpus of players used in the above techniques.

The telemetry typically comprises a task/quest/objective ID, and optionally a game ID, for example where the task/quest/objective ID is not guaranteed to be unique across all games; and a completion time. For embodiments of the above techniques that use further filtering of the corpus, for example based on user demographics or in game circumstances, then the appropriate information may also be transmitted as part of the telemetry.

A particular entertainment device, for example 10A, then requests objective completion time predictions for the user who is currently logged onto that device (different users may log onto the same device and play the same games, and so separate respective data may be stored for each user who logs into the device).

If the user is already within a game, then quests already available to the user within the game may be identified to the server using the task/quest/objective ID and optionally the game ID as required. To reduce overall server load, optionally only a top Q quests (e.g. where Q is 1, 2, 3, 4, 5, 6, 7, 8, 9 or 10, or any suitable number) are sent to the server. These may for example comprise already open quests, quests whose start condition is local to the user, or quests identified as core game quests (i.e. quests whose completion will eventually be necessary to complete the game). Where this produces fewer than Q quests, then wildcard requests may also be selected at random and added to the list submitted to the server.

In addition, the user's average decile or predicted decile is also obtained. This may be done in a variety of ways. The entertainment device may provide the game objective IDs for the previous N completed quests as part of the request, and the completion times or previously calculated deciles of the user for those quests can be recalled by the server from a store at the server, or also sent to the server by the entertainment device. Alternatively, the server may keep track of the user's progress and maintain the last N quest decile values without the need for further identification of these to be transmitted, either as absolute completion times or as calculated deciles, or both (it will be appreciated that a user's deciles may change as other player results are received, and so a user's deciles may be periodically recalculated from the recorded completion times, for as long as those are part of the record of last N quest values). Alternatively, the entertainment device may have received the previously calculated deciles from the server as part of a prediction process (as described below) and so provide these directly to the server, or calculate and provide the average or predicted decile, as appropriate.

In any event, using any of the above techniques as appropriate the server obtains a request to predict a completion time for a given quest for the given user, together with assumed or actual decile values for N previous quests or the average or prediction based upon those deciles, for that user.

It can then use data from a corpus of players who have already completed the given quest and for which a completion time is known, and the average or predicted decile for their N preceding quests, and proceed to use the conditional inference tree technique described herein to generate completion statistics for one or more output nodes; then as described previously herein, the user's own corresponding average or predicted decile for their N preceding quests can then be used to obtain a predicted average time and/or time range, for example based on lower and upper quartiles.

It will be appreciated that for each quest in a game, a conditional inference tree can be generated in advance once a sufficiently large corpus of players are available, and may be refreshed only periodically (for example if a threshold number of new records have been obtained for the quest). Hence in principle it is not necessary to re-compute the conditional inference tree in response to each request; rather once a conditional inference tree has been generated, the average or predicted decile associated with a request can be quickly and efficiently used to identify the relevant output node and hence obtain the prediction.

It will also be appreciated that any of the variant approaches described herein may be used by the server, and where these require additional information, such as identification of preceding quests, these may also be included in the telemetry.

Again it will be appreciated that for some of these techniques, a conditional inference tree can be generated in advance and may be refreshed only periodically.

Once the server has obtained a predicted average time and/or time range for the requested quest or quests, these can be returned to the requesting client device.

The requesting client device can then use these as described previously herein, to augment a game icon, or a game information panel once an icon has been interacted with, or to populate or rank an in-game quest menu, or to compare predicted times with a target gameplay period and highlight quests within a game that closely match the target gameplay period (for example having an upper quartile within a predetermined tolerance of the target gameplay period) or games comprising such quests within a library, and optionally open a game with such a quest automatically activated, for example when the game is selected by the user.

Figure 7:
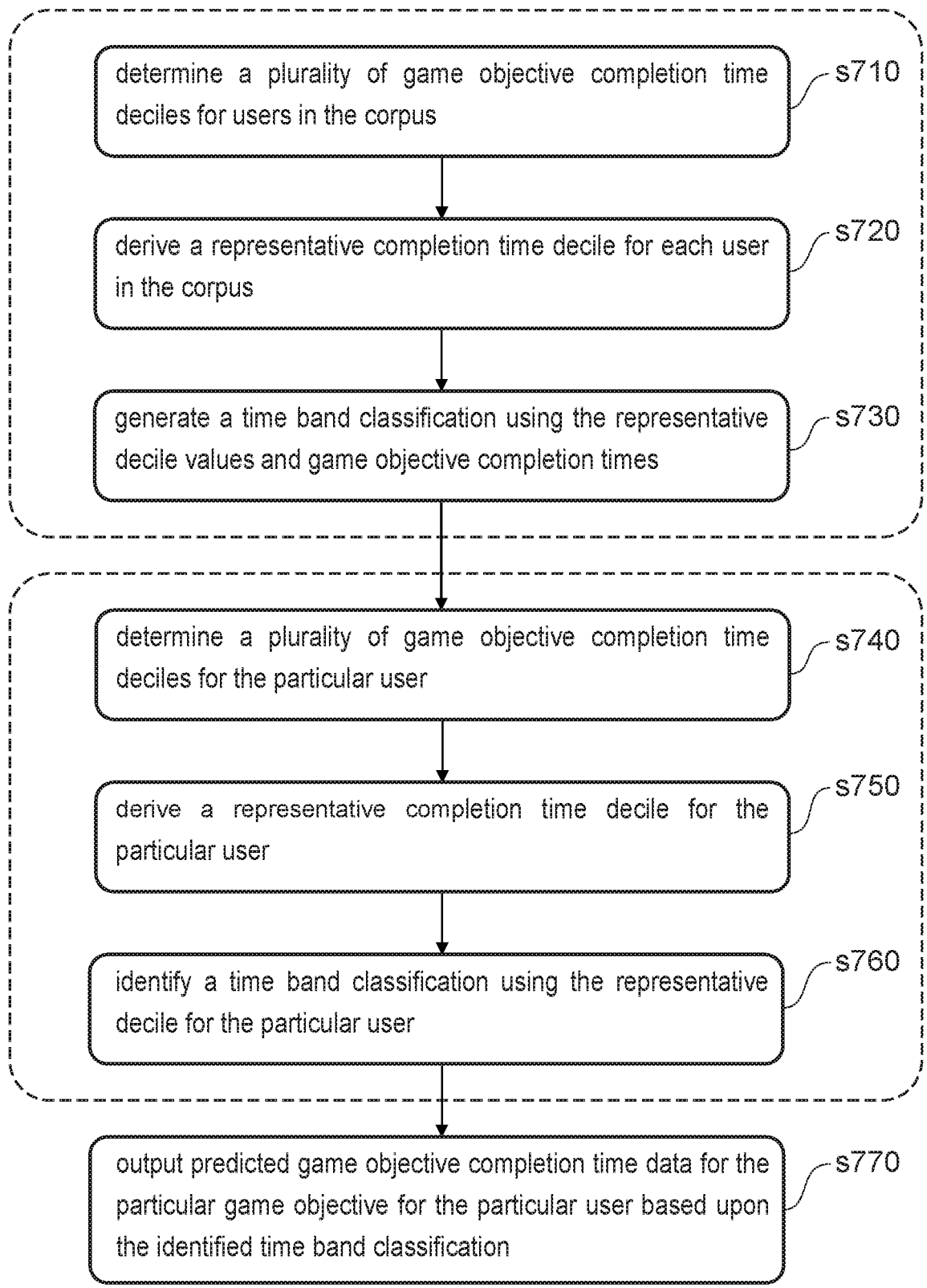
FIG. 7 is a flow diagram of a method of predicting a game objective completion time for a particular game objective for a particular user, in accordance with embodiments of the present description.

Referring now to FIG. 7, in a summary embodiment of the present invention a method of predicting a game objective completion time for a particular game objective for a particular user comprises:

Firstly, for a corpus of other users who have completed the particular game objective, In a first step s710, determining a plurality of game objective completion time deciles for a preceding predetermined number of other game objectives completed by users in the corpus of users (e.g., N deciles, as described previously herein), In a second step s720, deriving a representative completion time decile from the plurality of game objective completion time deciles for each user in the corpus of users, as described previously herein, and In a third step s730, generating a time band classification using the representative decile values as input variables and corresponding game objective completion times for the particular game objective as the output variable, as described previously herein for example with reference to FIG. 4.

Secondly, for the particular user,

In a fourth step s740, determining a game objective completion time decile for the preceding predetermined number of other game objectives completed by the particular user;

In a fifth step 750, deriving a representative completion time decile from the plurality of game objective completion time deciles for the particular user;

In a sixth step 760, identifying a time band classification of the particular user using the representative completion time decile for the particular user as input to the generated time band classification;

and then,

In a seventh step s770, outputting predicted game objective completion time data for the particular game objective for the particular user based upon the identified time band classification.

It will be apparent to a person skilled in the art that variations in the above method corresponding to operation of the various embodiments of the method and/or apparatus as described and claimed herein are considered within the scope of the present disclosure, including but not limited to:

the time band classification being a dynamic time band classification using a conditional inference tree, as discussed previously herein;

splits in the tree structure being formed when respective distributions around two or more means in the corresponding game objective completion times are detected with a threshold confidence, as discussed previously herein for example with reference to a t-test;

the representative completion time decile being the average of the preceding predetermined number of game objective completion time deciles, or the representative completion time decile being a predicted decile value (for example a linear prediction as described previously) based on a sequence of the preceding predetermined number of game objective completion time deciles;

the game objective completion time deciles for a preceding predetermined number of other game objectives comprise one or more selected from the list consisting of assumed neutral decile values (e.g. decile 5 as described previously herein), and deciles from the completion of game objectives in a different game, as described previously herein, if the number of game objectives completed in the particular game by the particular user is fewer than the predetermined number;

generating a new band classification for a different in-game variable, for the corpus of users corresponding to a particular output node of the generated a time band classification, as described previously, for example by, for one or more time band classifications, for a corpus of other users classified into the respective time band classification, determining a plurality of game objective game variable deciles for a preceding predetermined number of other game objectives completed by users in the corpus of users, where the game variable is a variable other than completion time, deriving a representative game variable decile from the plurality of game objective completion time deciles for each user in the corpus of users, and generating a game variable band classification using the representative decile values as input variables and corresponding game objective completion times for the particular game objective as the output variable; and for the particular user, determining a game objective game variable decile for the preceding predetermined number of other game objectives completed by the particular user, for the corresponding game variable, deriving a representative game variable decile from the plurality of game objective game variable deciles for the particular user, and identifying a game variable band classification of the particular user using the representative game variable decile for the particular user as input to the generated game variable band classification; and in which the step of outputting predicted game objective completion time data for the particular game objective for the particular user is based upon the identified time band classification and, where a game variable band classification has been generated for the identified time band classification, also upon the identified game variable band classification;

game objectives being classified into a predetermined number of classes, and a representative game variable decile being derived for each class of game objective, based on game objective completion time deciles for a preceding predetermined number of other game objectives in the respective class;

the corpus of other users being initially filtered according to one or more selected from the list consisting of demographic similarity to the particular user, game preference similarity to the particular user, awarded trophy similarity to the particular user, and game play style similarity to the particular user;

the corpus of other users being initially filtered according to one or more selected from the list consisting of the similarity of in-game state for the particular game to the in-game state of the particular user, and the similarity in the order of the preceding predetermined number of other completed game objectives.

the step of outputting predicted game objective completion time data comprising including a predicted time in-game to reach a start condition for the particular game objective; and outputting predicted game objective completion time data comprising one or more selected from the list consisting of displaying the predicted game objective completion time data in association with an icon of the game, prior to any launch of the game, displaying the predicted game objective completion time data within an information panel for a game, prior to any launch of the game, displaying the predicted game objective completion time data within the launched game, where the particular user has a stipulated play duration (e.g. a preferred play duration provided by the user, or a play duration set by parental control), promoting (for example within a list of options) or highlighting a game having predicted game objective completion time data within a predetermined tolerance of the play duration, and where the particular user has a stipulated play duration (again e.g. set by or imposed on the player), upon selection of a game for launch, launching that game with a game objective having a predicted game objective completion time within a predetermined tolerance of the play duration activated.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Hence in a summary embodiment of the present invention, a server 610 (any suitable server, but for the purposes of explanation, as a non-limiting example a PlayStation 4® operating as a server) operable to predict a game objective completion time for a particular game objective for a particular user, comprising a receiver (such as Ethernet® port 32) operable to receive a request to predict a game objective completion time for a particular game objective for a particular user (for example from one of client devices 10A . . . 10M); a memory (such as RAM 22, or HDD 37) operable to store data for a corpus of other users who have completed the particular game objective; a processor (such as CPU 20A), operable (for example under suitable software instructions) to determine, for the corpus, a plurality of game objective completion time deciles for a preceding predetermined number of other game objectives completed by users in the corpus of users; a processor (such as CPU 20A), operable (for example under suitable software instructions) to derive, for the corpus, a representative completion time decile from the plurality of game objective completion time deciles for each user in the corpus of users, and a processor (such as CPU 20A), operable (for example under suitable software instructions) to generate, for the corpus, a time band classification using the representative decile values as input variables and corresponding game objective completion times for the particular game objective as the output variable; a processor (such as CPU 20A), operable (for example under suitable software instructions) to determine, for the particular user, a game objective completion time decile for the preceding predetermined number of other game objectives completed by the particular user; a processor (such as CPU 20A), operable (for example under suitable software instructions) to derive, for the particular user, a representative completion time decile from the plurality of game objective completion time deciles for the particular user; a processor (such as CPU 20A), operable (for example under suitable software instructions) to identify a time band classification of the particular user using the representative completion time decile for the particular user as input to the generated time band classification; and a transmitter (such as Ethernet® port 32) operable to output, to a requesting client, predicted game objective completion time data for the particular game objective for the particular user based upon the identified time band classification.

It will be appreciated that the server may be made operable to perform any of the techniques described and claimed herein under suitable software instruction.

Similarly, in a summary embodiment a system comprises the above server and an entertainment device (such as, by way of non-limiting example, a Sony PlayStation 4®), the entertainment device comprising a transmitter (such as Ethernet® port 32 or Wifi® 34) operable to transmit a request (e.g. to the server) to predict a game objective completion time for a particular game objective for a particular user; a receiver (such as Ethernet® port 32 or Wifi® 34) operable to receive predicted game objective completion time data for the particular game objective for the particular user; and wherein the entertainment device is operable to execute a process to perform one or more selected from the list consisting of outputting for display the predicted game objective completion time data in association with an icon of the game, prior to any launch of the game, outputting for display the predicted game objective completion time data within an information panel for a game, prior to any launch of the game, outputting for display the predicted game objective completion time data within the launched game, where a preferred play duration has been provided by the particular user, highlighting in an output for display a game having predicted game objective completion time data within a predetermined tolerance of the preferred play duration, and where a preferred play duration has been provided by the particular user, upon selection of a game for launch, launching that game with a game objective having a predicted game objective completion time within a predetermined tolerance of the preferred play duration activated. It will be appreciated that this may be a non-exhaustive list of output options.

The invention claimed is:

1. A method of predicting a game objective completion time for a particular game objective for a particular user, comprising the steps of:
   for a corpus of other users who have completed the particular game objective,
      determining a plurality of game objective completion time deciles for a preceding predetermined number of other game objectives completed by users in the corpus of users,
      deriving a representative completion time decile from the plurality of game objective completion time deciles for each user in the corpus of users, and
      generating a time band classification using the representative decile values as input variables and corresponding game objective completion times for the particular game objective as the output variable;
   for the particular user,
      receiving a preferred playing duration for the particular user as indicated by the particular user through a user interface,
      determining a game objective completion time decile for the preceding predetermined number of other game objectives completed by the particular user,
      deriving a representative completion time decile from the plurality of game objective completion time deciles for the particular user, and
      identifying a time band classification of the particular user using the representative completion time decile for the particular user as input to the generated time band classification; and
      outputting predicted game objective completion time data for the particular game objective for the particular user based upon the identified time band classification, wherein the step of outputting predicted game objective completion time data comprises one or both of (i) highlighting a game having predicted game objective completion time data within a predetermined tolerance of the preferred playing duration, and (ii) upon selection of a game for launch, launching that game with a game objective having a predicted game objective completion time within a predetermined tolerance of the preferred playing duration activated.

2. The method according to claim 1, in which the time band classification is a dynamic time band classification using a conditional inference tree.

3. The method according to claim 2, in which splits in the tree structure are formed when respective distributions around two or more means in the corresponding game objective completion times are detected with a threshold confidence.

4. The method according to claim 1, in which the representative completion time decile is the average of the preceding predetermined number of game objective completion time deciles.

5. The method according to claim 1, in which the representative completion time decile is a predicted decile value based on a sequence of the preceding predetermined number of game objective completion time deciles.

6. The method according to claim 1, in which the game objective completion time deciles for a preceding predetermined number of other game objectives comprise one or more selected from the list consisting of:
 i. assumed neutral decile values; and
 ii. deciles from the completion of game objectives in a different game,
 if the number of game objectives completed in the particular game by the particular user is fewer than the predetermined number.

7. The method according to claim 1, comprising the steps of:
 for one or more time band classifications,
  for a corpus of other users classified into the respective time band classification,
   determining a plurality of game objective game variable deciles for a preceding predetermined number of other game objectives completed by users in the corpus of users, where the game variable is a variable other than completion time,
   deriving a representative game variable decile from the plurality of game objective completion time deciles for each user in the corpus of users, and
   generating a game variable band classification using the representative decile values as input variables and corresponding game objective completion times for the particular game objective as the output variable;
 for the particular user,
  determining a game objective game variable decile for the preceding predetermined number of other game objectives completed by the particular user, for the corresponding game variable,
  deriving a representative game variable decile from the plurality of game objective game variable deciles for the particular user, and
  identifying a game variable band classification of the particular user using the representative game variable decile for the particular user as input to the generated game variable band classification;
 and in which
  the step of outputting predicted game objective completion time data for the particular game objective for the particular user is based upon the identified time band classification and, where a game variable band classification has been generated for the identified time band classification, also upon the identified game variable band classification.

8. The method according to claim 1, in which
 game objectives are classified into a predetermined number of classes; and
 a representative game variable decile is derived for each class of game objective, based on game objective completion time deciles for a preceding predetermined number of other game objectives in the respective class.

9. The method according to claim 1, in which
 the corpus of other users is initially filtered according to one or more selected from the list consisting of:
  i. demographic similarity to the particular user;
  ii. game preference similarity to the particular user;
  iii. awarded trophy similarity to the particular user; and
  iv. game play style similarity to the particular user.

10. The method according to claim 1, in which
 the corpus of other users is initially filtered according to one or more selected from the list consisting of:
  i. the similarity of in-game state for the particular game to the in-game state of the particular user; and
  ii. the similarity in the order of the preceding predetermined number of other completed game objectives.

11. The method according to claim 1, in which the step of outputting predicted game objective completion time data comprises:
 including a predicted time in-game to reach a start condition for the particular game objective.

12. The method according to claim 1, in which the step of outputting predicted game objective completion time data further comprises one or more selected from the list consisting of:
 i. displaying the predicted game objective completion time data in association with an icon of the game, prior to any launch of the game;
 ii. displaying the predicted game objective completion time data within an information panel for a game, prior to any launch of the game; and
 iii. displaying the predicted game objective completion time data within the launched game.

13. A non-transitory computer-readable medium having stored thereon a computer program comprising computer executable instructions adapted to cause a computer system to perform a method of predicting a game objective completion time for a particular game objective for a particular user, the method comprising the steps of:
 for a corpus of other users who have completed the particular game objective,
  determining a plurality of game objective completion time deciles for a preceding predetermined number of other game objectives completed by users in the corpus of users,
  deriving a representative completion time decile from the plurality of game objective completion time deciles for each user in the corpus of users, and
  generating a time band classification using the representative decile values as input variables and corresponding game objective completion times for the particular game objective as the output variable;
 for the particular user,
  receiving a preferred playing duration for the particular user as indicated by the particular user through a user interface,
  determining a game objective completion time decile for the preceding predetermined number of other game objectives completed by the particular user,
  deriving a representative completion time decile from the plurality of game objective completion time deciles for the particular user, and
  identifying a time band classification of the particular user using the representative completion time decile for the particular user as input to the generated time band classification; and
  outputting predicted game objective completion time data for the particular game objective for the particular user based upon the identified time band classification, wherein the step of outputting predicted game objective completion time data comprises one or both of (i) highlighting a game having predicted game objective completion time data within a predetermined tolerance of the preferred playing duration, and (ii) upon selection of a game for launch, launching that game with a game objective having a predicted game objective completion time within a predetermined tolerance of the preferred playing duration activated.

14. A server operable to predict a game objective completion time for a particular game objective for a particular user, comprising:
   a receiver operable to receive a request to predict a game objective completion time for a particular game objective for a particular user;
   a memory operable to store data for a corpus of other users who have completed the particular game objective;
   a processor operable to
      determine, for the corpus, a plurality of game objective completion time deciles for a preceding predetermined number of other game objectives completed by users in the corpus of users;
      derive, for the corpus, a representative completion time decile from the plurality of game objective completion time deciles for each user in the corpus of users, and
      generate, for the corpus, a time band classification using the representative decile values as input variables and corresponding game objective completion times for the particular game objective as the output variable;
      control determining a preferred playing duration for the particular user as indicated by the particular user through a user interface;
      determine, for the particular user, a game objective completion time decile for the preceding predetermined number of other game objectives completed by the particular user;
      derive, for the particular user, a representative completion time decile from the plurality of game objective completion time deciles for the particular user; and
      identify a time band classification of the particular user using the representative completion time decile for the particular user as input to the generated time band classification; and
   a transmitter operable to output, to a requesting client, predicted game objective completion time data for the particular game objective for the particular user based upon the identified time band classification, wherein outputting predicted game objective completion time data comprises one or both of (i) highlighting a game having predicted game objective completion time data within a predetermined tolerance of the preferred playing duration, and (ii) upon selection of a game for launch, launching that game with a game objective having a predicted game objective completion time within a predetermined tolerance of the preferred playing duration activated.

15. A system, comprising:
   a server operable to predict a game objective completion time for a particular game objective for a particular user, the server comprising
      a receiver operable to receive a request to predict a game objective completion time for a particular game objective for a particular user;
      a memory operable to store data for a corpus of other users who have completed the particular game objective;
      a processor operable to
         determine, for the corpus, a plurality of game objective completion time deciles for a preceding predetermined number of other game objectives completed by users in the corpus of users;
         derive, for the corpus, a representative completion time decile from the plurality of game objective completion time deciles for each user in the corpus of users, and
         generate, for the corpus, a time band classification using the representative decile values as input variables and corresponding game objective completion times for the particular game objective as the output variable;
         control determining a preferred playing duration for the particular user as indicated by the particular user through a user interface;
         determine, for the particular user, a game objective completion time decile for the preceding predetermined number of other game objectives completed by the particular user;
         to derive, for the particular user, a representative completion time decile from the plurality of game objective completion time deciles for the particular user; and
         identify a time band classification of the particular user using the representative completion time decile for the particular user as input to the generated time band classification; and
      a transmitter operable to output, to a requesting client, predicted game objective completion time data for the particular game objective for the particular user based upon the identified time band classification, wherein outputting predicted game objective completion time data comprises one or both of (i) highlighting a game having predicted game objective completion time data within a predetermined tolerance of the preferred playing duration, and (ii) upon selection of a game for launch, launching that game with a game objective having a predicted game objective completion time within a predetermined tolerance of the preferred playing duration activated; and
   an entertainment device, comprising
      a transmitter operable to transmit a request to predict a game objective completion time for a particular game objective for a particular user;
      a receiver operable to receive predicted game objective completion time data for the particular game objective for the particular user;
      and wherein the entertainment device is operable to execute a process to perform one or more selected from the list consisting of:
      i. outputting for display the predicted game objective completion time data in association with an icon of the game, prior to any launch of the game;
      ii. outputting for display the predicted game objective completion time data within an information panel for a game, prior to any launch of the game; and
      iii. outputting for display the predicted game objective completion time data within the launched game.

* * * * *